United States Patent [19]

McCullen et al.

[11] Patent Number: 4,752,595

[45] Date of Patent: Jun. 21, 1988

[54] CATALYST PRETREATMENT FOR REGENERATED NOBLE METAL ON ZEOLITE CATALYST

[75] Inventors: Sharon B. McCullen, Newtown; Y. Y. Peter Tsao, Langhorne, both of Pa.; Stephen S. Wong, Medford, N.J.

[73] Assignee: Mobil Oil Corporation, New York, N.Y.

[21] Appl. No.: 938,088

[22] Filed: Dec. 4, 1986

[51] Int. Cl.⁴ .................. B01J 29/38; B01J 39/18; B01J 38/14; B01J 38/10
[52] U.S. Cl. .................. 502/50; 208/111; 502/52; 502/53
[58] Field of Search ............... 502/50, 52, 53; 200/111

[56] References Cited

U.S. PATENT DOCUMENTS

| | | | |
|---|---|---|---|
| 3,197,397 | 7/1965 | Wight et al. | 208/111 |
| 3,357,915 | 12/1967 | Young | 208/111 |
| 3,360,481 | 12/1967 | McLaren et al. | 502/53 |
| 3,480,558 | 11/1969 | Lum et al. | 252/416 |
| 3,966,636 | 6/1976 | Jenkins et al. | 252/419 |
| 3,986,982 | 10/1976 | Crowson et al. | 252/415 |
| 4,116,867 | 9/1978 | Ward | 502/50 |
| 4,300,014 | 11/1981 | Yamasaki et al. | 502/52 |
| 4,322,315 | 3/1982 | Drake | 252/415 |
| 4,358,395 | 11/1982 | Haag et al. | 252/411 R |
| 4,501,926 | 2/1985 | LaPierre et al. | 585/739 |

FOREIGN PATENT DOCUMENTS

| | | | |
|---|---|---|---|
| 210854 | 12/1983 | Japan | 502/50 |
| 1148545 | 4/1969 | United Kingdom . | |

Primary Examiner—Paul E. Konopka
Attorney, Agent, or Firm—A. J. McKillop; M. G. Gilman; L. P. Hobbes

[57] ABSTRACT

A process is described for regenerating a coke and poison deactivated noble metal-containing zeolite catalyst material. The activity of the catalyst after oxygen regeneration can be improved by treating the oxidized catalyst at temperatures from 100° to 250° C. (212°-482° F.) or lower, preferably 100° to 200° C. (212°-392° F.), or most preferably 150° to 200° C. (302°-392° F.), in a reducing atmosphere, as opposed to higher conventional reducing temperatures. The process permits catalyst reactivation by removing coke and other poisons, such as nitrogen, from the catalyst while avoiding excess agglomeration of the noble metals thereon.

11 Claims, 1 Drawing Sheet

CATALYST PRETREATMENT FOR REGENERATED NOBLE METAL ON ZEOLITE CATALYST

BACKGROUND OF THE INVENTION

1. Field of the Invention

The invention relates to a process for regenerating noble metal-containing zeolite catalysts which have been deactivated by coke buildup or poisoning. In particular, it relates to a pretreatment process for regenerated catalysts at temperatures from 100° to 250° C. (212°–482° F.). Regenerated catalysts which may be pretreated by the process of the present invention include those that have become deactivated during hydrocarbon hydroprocesses, such as the catalytic dewaxing of hydrocarbon feedstocks.

2. Discussion of the Prior Art

Catalytic dewaxing of hydrocarbon feedstocks, such as distillate fuel oils and gas oils, by isomerization over a Zeolite Beta catalyst is known in the art. U.S. Pat. No. 4,501,926 to LaPierre et al discloses such a process, and is incorporated herein by reference. However, this process requires regeneration to reactivate the isomerization catalyst after being deactivated by coke buildup or poisoning by materials, such as nitrogen, or heavy metals, such as vanadium. Detailed background on catalysis, catalyst poisons and catalyst regeneration and rejuvenation is provided by "Catalyst Deactivation and Regeneration", *Chemical Engineering*, Vol. 91, No. 23, Nov. 12, 1984. Rejuvenation is generally a reactivation process employing a halogen compound to redisperse agglomerated metal on a catalyst, whereas regeneration is generally a reactivation process not employing a halogen compound.

Processes which utilize chlorine and oxygen in catalyst reactivation are well known. For example, U.S. Pat. No. 3,986,982 to Crowson et al treats deactivated platinum group metal-loaded zeolites by contacting them with a stream of inert gas containing from 0.5 to 20 vol % of free oxygen, and from 5 to 500 ppm volume of chlorine as molecular chlorine, HCl, or inorganic chlorine-containing material. The resulting catalyst is purged to remove residual oxygen and chlorine and then reduced in a stream of hydrogen at 200°–600° C. (392°–1112° F.).

British Pat. No. 1,148,545 discloses a process that is effective for decoking a dual function catalyst, comprising heating catalyst from oxidative burnoff at a temperature of at least 427° C. (800° F.), cooling the catalyst to below 316° C. (600° F.) and partially rehydrating the catalyst, and contacting the partially rehydrated catalyst with hydrogen at a temperature of at least 454° C. (850° F.). However, this involves the hydration and repeated heating and cooling steps, which may cause expansion and contraction of catalysts, and resulting catalyst attrition.

U.S. Pat. No. 3,986,982 to Haag et al discloses catalyst regeneration by contacting the zeolite with hydrogen. The catalyst is contacted with oxygen, pre-coked under controlled conditions, and then contacted with molecular hydrogen under controlled conditions. This process has the drawback of requiring a pre-coking step.

Catalyst regeneration employing oxidation or reduction may be conducted either in situ within a reactor or off-site outside a reactor. Off-site regeneration may comprise contacting a thin layer of catalyst on a moving belt with the oxidizing or reducing gas. There are some benefits to off-site reduction, because it allows high temperature throughout of oxygen without danger of temperature runaway. Also, impurities are removed from the catalyst layer without having to contact other catalysts downstream in the same layer, as in the case for in situ regeneration. Halogen treatment requires certain precautions owing to the corrosive nature of the halogen used. In addition, certain halogen materials employed in these processes add significantly to the cost of catalyst reactivation. In order to avoid the drawbacks associated with halogen use, it would be advantageous to reactivate catalysts in the absence of halogens. However, when deactivating coke present on a catalyst material by exposure to an oxidizing atmosphere of oxygen and an inert gas, such as nitrogen, substantially all of the noble metal on the catalyst may be catalytically inactive.

SUMMARY OF THE INVENTION

The inventors have found an improved catalyst regeneration procedure for oxygen-regenerated noble metal on zeolite catalysts. The inventors have made the unexpected finding that the activity of the catalyst after oxygen regeneration can be improved by treating the oxygen-regenerated catalyst at a temperature from 100° to 250° C. (212°–482° F.) in a reducing atmosphere, as compared to conventional higher reduction temperatures.

Accordingly, an object of the present invention is to provide a process which substantially regenerates a noble metal-containing zeolite catalyst by oxidizing the catalyst and reducing the oxidized catalyst at a temperature from 100° to 250° C. (212°–482° F.).

Another object of the present invention is to provide a cyclic dewaxing/regeneration process, which produces similar products under similar conditions, whether it uses fresh catalysts or regenerated catalysts, wherein the dewaxing is by isomerization of a hydrocarbon feedstock to produce lube products and the regeneration includes oxidizing a platinum-containing zeolite catalyst and reducing the oxidized catalyst at a temperature from 100° to 250° C. (212°–482° F.).

The invention applies to zeolite catalysts comprising about 0.01 to 10 wt % noble metal, preferably 0.1 to 5 wt % noble metal based on the zeolite, and most preferably 0.1 to 1.2 wt % of a noble metal such as platinum.

In accordance with the present invention, a deactivated noble metal-containing zeolite catalyst material, which has been deactivated by hydrocarbon processing, is regenerated by a process comprising the steps of:

oxidizing the deactivated catalyst; and reducing the oxidized catalysts by contacting the oxidized catalyst with a reducing stream comprising hydrogen at a temperature from 100° to 250° C. (212°–482° F.).

More particularly, the process regenerates a deactivated catalyst comprising a zeolite having the structure of Zeolite Beta and about 0.1 to about 1.2 wt % platinum metal based on the zeolite, wherein the catalyst has been deactivated during the dewaxing of a hydrocarbon feedstock, comprising the steps of:

oxidizing the deactivated catalyst; and reducing the oxidized catalyst by contacting the catalyst with a reducing gas comprising 50 vol % hydrogen at a temperature from 150° to 200° C. (302°–392° F.), a hydrogen partial pressure from atmospheric to 30 atmospheres, and a catalyst residence time of 20 minutes to 10 hours.

The invention also comprises a process for dewaxing a hydrocarbon feedstock, comprising the steps of:

dewaxing a first stream of the feedstock by contacting it with a first catalyst comprising zeolite and a noble metal under dewaxing conditions of temperature, pressure, space velocity and hydrogen feed rate to produce a first effluent stream of desired pour point until the first catalyst is deactivated;

oxidizing the deactivated catalyst;

reducing the oxidized catalyst by contact with a reducing gas comprising hydrogen at a temperature from 100° to 250° C. (212°-482° F.); and dewaxing a second stream of the feedstock by contacting it with the reduced catalyst at about the same conditions of pressure, space velocity, and hydrogen feed rate as in the first dewaxing step and a temperature less than 20° C. (36° F.) above the temperature of the first dewaxing step, thereby producing a second effluent stream having substantially the same pour point as the first effluent stream.

More particularly, the invention provides a process for dewaxing a hydrocarbon feedstock, comprising the following steps:

dewaxing a first stream of the feedstock by contacting a first catalyst comprising a zeolite having the structure of Zeolite Beta and about 0.1 to about 1.2 wt % platinum based on said zeolite under dewaxing conditions of temperature, pressure, space velocity, and hydrogen feed rate to produce a first effluent stream of desired pour point until the catalyst is deactivated;

oxidizing the deactivated catalyst;

reducing the oxidized catalyst by contacting the oxidized catalyst with a reducing gas comprising 50 vol % hydrogen at a temperature from 150° to 200° C. (302°-392° F.), a hydrogen partial pressure from atmospheric to 30 atmospheres, and a catalyst residence time of 20 minutes to 10 hours; and dewaxing a second stream of the feedstock by contacting it with the reduced catalyst at about the same dewaxing conditions of pressure, space velocity, and hydrogen feed rate as in the first dewaxing step and a temperature less than 15° C. (27° F.) above that of the first dewaxing step to produce a second effuent stream having substantially the same pour point as the first effluent stream.

The invention also comprises a process for catalytically dewaxing a hydrocarbon feedstock, comprising the steps of:

dewaxing the feedstock at dewaxing conditions by contact with a regenerated dewaxing catalyst comprising a noble metal and a zeolite to produce an effluent stream having a pour point less than that of the feedstock; and wherein the dewaxing catalyst is regenerated prior to the dewaxing step by oxidizing the dewaxing catalyst and reducing the oxidized catalyst by contact with a reducing gas comprising hydrogen at a temperature from 100° to 250° C. (212°-482° F.).

More particularly, the invention is a process for catalytically dewaxing a hydrocarbon feedstock, comprising the steps of:

dewaxing the feedstock at dewaxing conditions by contact with a regenerated dewaxing catalyst comprising a zeolite having the structure of Zeolite Beta and about 0.1 to about 1.2 wt % platinum based on said zeolite to produce an effluent stream having a pour point less than that of the feedstock; and wherein the dewaxing catalyst is regenerated prior to the dewaxing step by oxidizing the dewaxing catalyst and reducing the oxidized catalyst by contact with a reducing gas comprising 50 vol % hydrogen, at a temperature from 150° to 200° C. (302°-392° F.), a hydrogen partial pressure from atmospheric to 30 atmospheres, and a catalyst residence time from 20 minutes to 10 hours.

The present invention applies low temperature reduction to a noble metal-containing zeolite catalyst. These catalysts are typically employed in dewaxing, olefin hydrogenation and reforming. The invention particularly applies to low temperature reduction of catalysts, such as Zeolite Beta, and intermediate pore zeolites, such as ZSM-5, which are employed for dewaxing.

DESCRIPTION OF THE PREFERRED EMBODIMENTS

The present invention relates to a process for regenerating an aged (deactivated) noble metal-containing zeolite catalyst material. The regeneration process provides a catalyst material of enhanced activity which retains a substantial portion of its noble metal in a dispersed form. The process comprises removing a portion of coke by oxidizing the aged catalyst with oxygen under suitable oxidizing conditions, and thereafter reducing the catalyst material by contact with hydrogen under suitable reducing conditions. The reducing conditions include a temperature from 100° to 250° C. (212°-482° F.), preferably 100° to 200° C. (212°-392° F.), and most preferably 150° to 200° C. (302°-392° F.).

Figure 1:
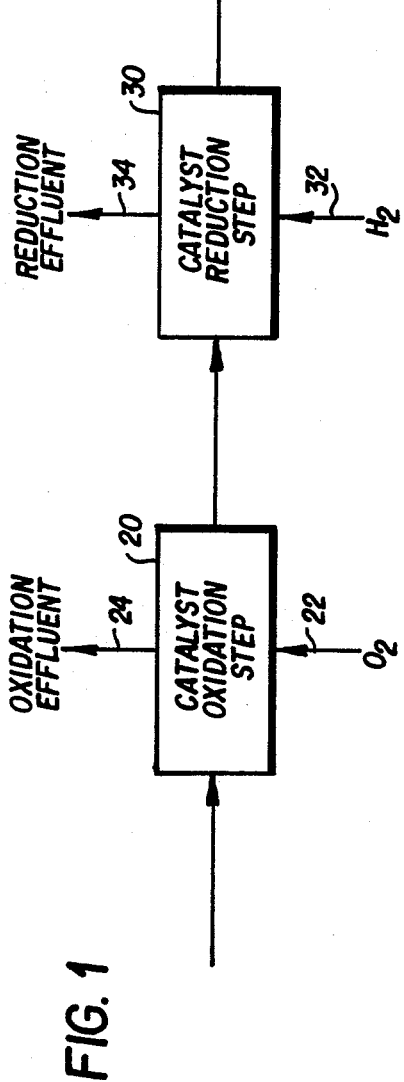
FIG. 1 is a flowchart of the regeneration process of the present invention.

As shown on FIG. 1, catalyst is treated in a catalyst oxidation step 20 by contact with an oxygen-containing gas stream 22 to burn off deactivating coke material to produce an oxidation effluent gas stream 24. Oxidation step 20 occurs under controlled oxidizing conditions of temperature, pressure, residence time and oxygen concentration. The coke material adheres to the catalyst due to previous hydrocarbon processing by processes such as dewaxing, olefin hydrogenation, or reforming. Suitable oxidizing conditions include temperatures ranging from 200° to 540° C. (392°-1004° F.), preferably 400° to 510° C. (752°-950° F.), pressures ranging from atmospheric to 25,000 kPa (3600 psig), preferably atmospheric to 10,000 kPa (1435 psig). The feed rate of the oxidizing gas may range from 4.2 to 17.0 standard cubic feet per hour per pound of catalyst, preferably 8 to 9 standard cubic feet per hour per pound of catalyst. It is preferred that the oxidizing conditions be mild enough to prevent any alteration in the crystal structure of the zeolite being treated.

In commercial operation, the gas stream 22 may contain 0.1 to 10 vol % oxygen, preferably 0.3 to 7 vol % oxygen, with the remainder being inert gas. The gas stream 22 may contain water. Higher oxygen concentrations may be employed with laboratory scale equipment. The control of oxygen concentration maintains temperature within the desired range mentioned above, and prevents or reduces agglomeration of the noble metals dispersed through the catalyst during the removal of coke from the zeolite catalyst material. To determine when oxidation is completed, the effluent gas stream 24 from oxidation is measured in a gas analyzer, such as a gas chromatograph, for oxygen concentration, and/or carbon monoxide and carbon dioxide evolution. Oxidation is completed when the oxygen concentration of stream 22, prior to contacting catalyst, equals the oxygen concentration of stream 24 after contacting the catalyst. Oxidation is also completed when the carbon monoxide and carbon dioxide evolution is negligible due to the absence of combustion.

Dispersion of the noble metals can be measured by hydrogen chemisorption. This technique indicates the extent of noble metal agglomeration of a catalyst material. Details of the analytical technique may be found in *Structure of Metallic Catalyst*, J. R. Anderson, Ch. 6, p. 295, Academic Press (1975).

In a reduction step 30, shown in FIG. 1, oxidized catalysts contact a hydrogen-containing gas stream 32 to produce a reduction effluent gas stream 34. The reduction step 30 follows removal of the coke by oxidation from the catalyst material and utilizes any suitable reducing agent, preferably hydrogen. Hydrogen may be taken from any of the hydrogen streams in a refinery, such as a hydrogen recycle stream or a stream from a steam reformer. Typically, the refinery streams will have a hydrogen concentration of greater than 50 vol %, with the remainder being inert gas. Preferably, the gas stream 32 contains at least 70 vol % molecular hydrogen ($H_2$), with the remainder being inert gas. Most preferably, the hydrogen stream 32 contains as close to 100 vol % hydrogen as possible. The hydrogen stream 32 should not contain any sulfur compounds, although the stream 32 may contain inert gases, such as nitrogen, carbon dioxide, carbon monoxide and $C_1$–$C_4$ hydrocarbons.

Reduction of the oxidized catalyst material is achieved by contacting it with the hydrogen stream 32 under suitable reducing conditions. These include temperatures from 100° to 250° C. (212°–482° F.), preferably 100° to 200° C. (212°–392° F.), and most preferably 150° to 200° C. (302°–392° F.), and catalyst residence times ranging from about 20 minutes to 24 hours, preferably 20 minutes to 10 hours. The reduction step 30 is carried out at hydrogen partial pressures ranging from atmospheric to 150 atmospheres, and preferably atmospheric to 30 atmospheres. The reduction reaction is favored by lower pressures. However, commercial reactors for dewaxing are typically reduced at about 20 to 40 atmospheres, because commercial dewaxing reactors often dewax at about that pressure. It sometimes facilitates commercial operation to both operate and regenerate at about the same pressure. The feed rate of the reducing gas 32 may range from 4.2 to 17 standard cubic feet/hour/pound catalyst, preferably 8 to 9 standard cubic feet/hour/pound catalyst.

There is typically a conventional purge of inert gas, such as nitrogen, between the oxidation step 20 and reduction step 30. The purge is usually at a pressure ranging from atmospheric to 150 atmospheres. The purge is at a temperature from 100° to 250° C. (212°–482° F.).

Previously, 300° to 450° C. (572°–842° F.) was preferred for reduction. Reduction is necessary because it converts platinum oxide, formed on the catalyst by oxidation, to platinum metal. The inventors unexpectedly discovered that catalyst would be more active when reduced at temperatures less than the typically favored reduction conditions of 300° to 450° C. (572°–842° F.). The inventors studied lower temperature reduction after they found that hydrogen chemisorption was not significant for catalysts reduced at typical reduction conditions. Catalysts that could not chemisorb hydrogen typically lacked catalytic activity. The ability of a catalyst to chemisorb hydrogen is essential for it to be reduced effectively. This led them to believe that catalyst activity would be greater after reduction at temperatures from 100° to 250° C. (212°–482° F.) or below. The 100° to 200° C. (212°–392° F.) range is preferred for reduction. Furthermore, 150° to 200° C. (302°–392° F.) is most preferred for reduction.

Figure 2:
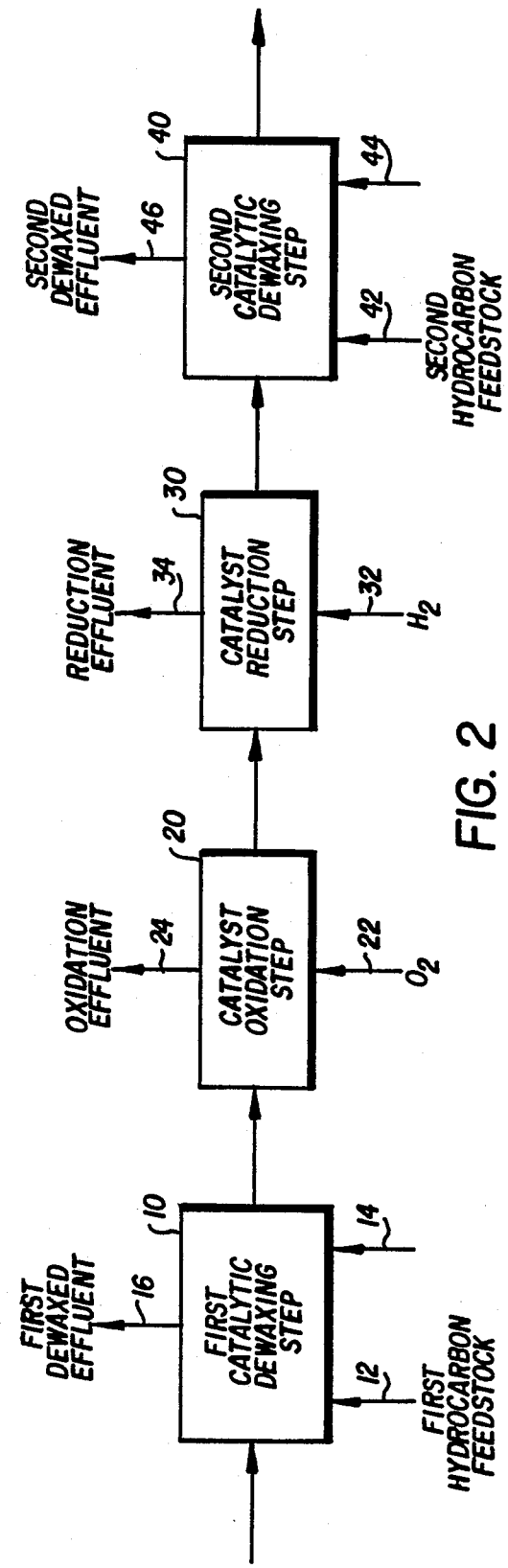
FIG. 2 is as flowchart of the cyclic dewaxing/regeneration process of the present invention.

Preferably, the regeneration process performed at the conditions outlined above for the catalyst oxidation step 20 and catalyst reduction step 30 are incorporated as part of a cyclic dewaxing/regeneration process, as shown by FIG. 2. The cyclic process includes a first dewaxing step 10, which comprises catalytically isomerizing a first hydrocarbon feedstock 12 comprising straight chain and slightly branched paraffins. The isomerization is carried out employing Zeolite Beta under isomerizing conditions disclosed by U.S. Pat. No. 4,501,926 to La Pierre et al, and incorporated herein by reference. The isomerization may be carried out in the presence of hydrogen provided by a hydrogen stream 14, which feeds the first catalytic dewaxing step 10. The dewaxing step 10 is carried out to produce a first dewaxed effluent stream 16 of desired pour point until the catalyst is deactivated and a quantity of coke and poisons adhere thereto. Preferably, the desired pour point is less than 30° F. (−1° C.). Dewaxing could also be carried out by other catalytic dewaxing processes employing catalysts such as intermediate pore zeolites, for example ZSM-5.

The deactivated catalyst is then regenerated by passing it into the catalyst oxidation step 20, and subsequently passing the oxidized catalyst into the catalyst oxidation step 30. The catalyst oxidation step 20 and catalyst oxidation step 30 have been outlined above in the discussion of the embodiment shown by FIG. 1. The effluents 24 and 34 from the regeneration steps 20 and 30, respectively, are sent to downstream disposal, such as a flare. Typically, a conventional purge of inert gas, such as nitrogen, is provided between the oxidation step 20 and the reduction step 30.

In a second catalytic dewaxing step 40, a second hydrocarbon feedstock stream 42 contacts the regenerated catalyst at the same conditions or pressure, space velocity, and hydrogen feed rate as the first catalytic dewaxing step 10. The temperature is less than 20° C. (36° F.), preferably less than 15° C. (27° F.), above that of the first dewaxing step 10, to produce a second dewaxed effluent stream 46 having a pour point substantially the same as that of the first dewaxed effluent stream 16. The dewaxing may be carried out in the presence of hydrogen provided by a hydrogen stream 44.

CATALYSTS

The zeolites which may be regenerated by the process of the present invention include zeolites having the structure of large pore zeolites, such as Zeolite Y, ZSM-3, ZSM-4, ZSM-18 and ZSM-20, as well as zeolites having the structure of Zeolite Beta, or intermediate pore zeolites having a Constraint Index of about 1 to about 12 and silica-to-alumina mole ratio greater than about 10. Examples of such materials include ZSM-5, ZSM-11, ZSM-5/ZSM-11 intermediates, ZSM-12, ZSM-23, ZSM-35, ZSM-38, ZSM-48 and other similar materials. It is preferred to dewax with intermediate pore zeolites or Zeolite Beta.

The intermediate pore zeolites, when combined with a noble metal, particularly platinum, can dewax in the presence of aromatics. The dewaxing occurs by shape-selective cracking.

Zeolite Beta, although nominally lare pore, can also dewax when combined with a noble metal in the presence of aromatics. The dewaxing occurs by shape-selective isomerization.

Other large pore zeolites only dewax under restricted conditions. These catalysts only dewax if they contain a hydrogenation component and the dewaxing feedstock contains at least 90 wt % paraffins. The dewaxing is by non-shape-selective isomerization. If the feedstock contains greater than 10 wt % aromatics, then the large pore zeolites preferentially hydrocrack the aromatics rather than dewax the paraffins.

Zeolite Y is described in greater detail in U.S. Pat. No. 3,130,007. The entire description contained therein, particularly the X-ray diffraction pattern of Zeolite Y, is incorporated herein by reference.

Zeolite Beta is described in U.S. Pat. No. 3,308,069. That description, including the X-ray diffraction pattern of Zeolite Beta, is incorporated herein by reference.

ZSM-3 is described in greater detail in U.S. Pat. No. 3,415,736. That description, and in particular the X-ray diffraction pattern of ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. That description, and in particular the specification of the X-ray diffraction pattern of the disclosed zeolite, is incorporated herein by reference.

ZSM-23 is described in U.S. Pat. No. 4,076,842. That description, and in particular the specification of the X-ray diffraction pattern of the disclosed zeolite, is incorporated herein by reference.

ZSM-35 is described in U.S. Pat. No. 4,016,245. That description, and particularly the X-ray diffraction pattern thereof, is incorporated herein by reference.

ZSM-38 is more particularly described in U.S. Pat. No. 4,046,859. That description, and particularly the specified X-ray diffraction pattern thereof, is incorporated herein by reference.

ZSM-48 is more particularly described in U.S. Pat. No. 4,397,827. That description, and particularly the specified X-ray diffraction pattern thereof is incorporated herein by reference.

Particularly preferred zeolites, for the purposes of the present invention, are those which have high silica-to-alumina mole ratios, e.g., greater than about 30 or even greater than 100 or 250.

The catalyst treated by the process of the present invention contains at least one noble metal, such as platinum, palladium, iridium, osmium, rhodium, rhenium and ruthenium.

The metal is required to dehydrate paraffins in a feedstock to olefins. The zeolite acid function adds $H^+$ ion to the olefin to form a carbonium ion. The carbonium ion isomerizes to a more stable form. For example, a tertiary ion is more stable than a secondary ion, and a secondary ion is more stable than a primary ion. Then, the $H^+$ ion decouples from the isomerized carbonium ion to form an olefin. Then the metal assists in hydrogenating the olefin to a paraffin.

Noble metal content, based on the zeolite, is in the range of 0.01 to 10 wt %, preferably 0.1 to 5 wt %, and most preferably 0.1 to 1.2 wt %, and can be incorporated into the zeolite catalyst by ion-exchange or impregnation. The catalyst can be steamed or acid treated prior to metal incorporation. The catalyst may be binder free or may contain an inorganic oxide binder, such as alumina, silica, or silica-alumina.

The invention will be still better understood by reference to the following examples. Examples 1 and 2 describe the performance of a platinum/steamed Zeolite Beta catalyst following regeneration. The catalyst had been used to process a feed containing 50 to 90 wt % n-paraffins, 10 to 50 wt % aromatics, 0.02 to 0.10 wt % sulfur, and 20 to 200 ppm nitrogen. Platinum/steamed Zeolite Beta on alumina is used for illustrative purposes.

EXAMPLE 1

This example shows the results of conventional regeneration. The catalyst material for this example comprised Zeolite Beta, alumina and about 1.2 wt % platinum (based on Zeolite Beta). The catalyst was prepared by binding 50 wt % Zeolite Beta and 50 wt % alumina with water, then calcining, steaming and platinum-exchanging the bound material.

One cubic centimeter of 30 to 40 mesh crushed catalyst and 1 cubic centimeter of 30 to 40 mesh Vycor glass were placed in a test reactor. Vycor is a heat-resistant glass. The test reactor had an inside diameter of ⅜-inch (1 centimeter) and a length of 17.3 inches (44 centimeters). The catalyst was then reduced by contact with hydrogen ($H_2$) at 350° C. (662° F.) and 1 atmosphere for a time of 1 hour. The catalyst was then employed in the test reactor to process a feed containing 50 to 90 wt % n-paraffins, 10 to 50 wt % aromatics, 0.02 to 0.10 wt % sulfur, and 20 to 200 ppm nitrogen to simulate the first dewaxing step 10 of FIG. 2. After processing, the platinum/steamed Zeolite Beta catalyst contained approximately 10 wt % coke.

The coked catalyst in the test reactor was oxygen regenerated by contact with an oxygen stream, representing stream 22 of FIG. 2. Oxygen regeneration occurred at 455° C. (851° F.), 100 psia total pressure, and 20 torr partial pressure $H_2O$. The oxygen stream contained an initial $O_2$ concentration of 0.5 vol %, with the remainder being helium. The oxygen concentration was gradually increased to a final concentration of 3.0 vol %. The oxidation step simulates the oxidation step 20 of FIG. 2. Then, the oxidized catalyst was reduced at 450° C. (842° F.) for 1 hour in hydrogen at atmospheric pressure to simulate a conventional catalyst reduction step.

The reduced catalyst was then employed for n-$C_{16}$ conversion at 500 psia and 1 LHSV to simulate the second catalytic dewaxing step 40. The n-$C_{16}$ conversion, including cracking and isomerization, was varied by increasing reactor temperature. Table 1 shows the temperatures required for 20, 40 and 60% n-$C_{16}$ conversion. Table 1 also provides the i-$C_{16}$ selectively. As known to those skilled in the art, the n-$C_{16}$ conversion is defined as the percent of the n-$C_{16}$ which converts to i-$C_{16}$ or cracked lighter products. The i-$C_{16}$ selectively is defined as the maximum i-$C_{16}$ yield divided by the n-$C_{16}$ conversion. Table 1 further compares the performance in terms of n-$C_{16}$ conversion and selectivity of the catalyst reduced at 450° C. (842° F.), compared to fresh platinum/steamed Zeolite Beta catalyst. This comparison shows a 20° C. (36° F.) temperature increase was required to maintain the n-$C_{16}$ conversion.

TABLE 1

| Catalyst | Fresh Pt/Steamed Zeolite Beta | Example 1 | Example 2 |
|---|---|---|---|
| Reduction temperature, °C. | 350 | 450 | 200 |
| T °C. at 20% n-$C_{16}$ Conversion | 320 | 340 | 330 |
| T °C. at 40% n-$C_{16}$ Conversion | 329 | 347 | 340 |
| T °C. at 60% n-$C_{16}$ Conversion | 332 | 350 | 345 |
| i-$C_{16}$ Selectivity* | 0.68 | 0.56 | 0.56 |

*i-$C_{16}$ selectivity is defined as maximum i-$C_{16}$ yield/n-$C_{16}$ conversion n-$C_{16}$ conversion and i-$C_{16}$ selectivity pertain to pour point. If a feedstock is dewaxed by a first catalyst to a given level of n-$C_{16}$ conversion and i-$C_{16}$ selectivity, and the feedstock is passed over a second catalyst and achieves the same n-$C_{16}$ conversion and i-$C_{16}$ selectivity, the two product streams would be expected to have about the same pour point.

EXAMPLE 2

The experiment was performed as described for Example 1, except that the catalyst was oxidized to simulate the catalyst oxidation step 20 and then reduced at 200° C. (392° F.) to simulate the catalyst reduction step 30. As shown in Table 1, only a 10° C. (18° F.) increase was required to maintain the n-$C_{16}$ conversion, compared to the fresh catalyst. In addition, the catalyst in the present example was 10° C. (18° F.) more active for n-$C_{16}$ conversion than the oxidized/reduced catalyst of Example 1.

EXAMPLE 3

Example 3 illustrates the hydrogen chemisorption of a catalyst which had been employed for dewaxing, then regenerated by oxidation followed by conventional reduction at 450° C. (842° F.). In the example, a noble metal-containing Zeolite Beta catalyst was prepared by binding 65 wt % Zeolite Beta and 35 wt % alumina with water, then calcining, steaming and platinum-exchanging the bound material.

The fresh platinum-containing Zeolite Beta catalyst was employed to dewax light vaccuum gas oil, having the composition listed on Table 2. The dewaxing depositioned a layer of coke on the catalyst. The coked catalyst contained 0.95 wt % platinum, based on Zeolite Beta.

TABLE 2

| Light Vacuum Gas Oil | |
|---|---|
| Pour Point, °C. (°F.) | 35 (95) |
| Kinematic Viscosity at 40° C., cs | 8.671 |
| Kinematic Viscosity at 100° C., cs | 2.547 |
| Bromine Number | 1.5 |
| API Gravity | 35.7° |
| Average Molecular Wt | 289 |
| Sulfur, wt % | 0.067 |
| Basic Nitrogen, ppm | 88 |
| Nitrogen, ppm | 200 |
| Hydrogen, wt % | 14.02 |
| Conradson Carbon Residue, wt % | 0.03 |
| Paraffins, wt % | 52.9 |
| Naphthenes, wt % | 28.1 |
| Aromatics, wt % | 19.0 |
| Initial boiling point, °C. (°F.) | 288 (550) |
| End boiling point, °C. (°F.) | 510 (950) |

After dewaxing, 25 grams of the coked catalyst was decoked in a quartz reactor having a 1-inch (2.54 centimeters) inside diameter and 17.5-inch (44 centimeters) length. The catalyst was decoked by oxidation at 427° C. (800° F.), 1 atmosphere total pressure, 380 torr $O_2$ maximum partial pressure, 50 torr $H_2O$ partial pressure. The oxidation occurred by feeding 300 cubic centimeters per minute of an oxidizing gas stream containing molecular oxygen into the test reactor, and gradually increasing oxygen concentration in the gas stream from 1 to 5 vol %, and ultimately to 50 vol % oxygen, to maintain a temperature of 454° C. (850° F.) for 16 hours. Temperature was measured by a first thermocouple at the middle of a catalyst bed in the test reactor and a second thermocouple located at the test reactor wall.

The oxidized catalyst was then cooled to room temperature. 3 to 5 grams of the oxidized catalyst was put into a chemisorption unit. The unit was then subjected to vacuum conditions of $1 \times 10^{-6}$ atmospheres at 450° C. (842° F.). The evacuated catalyst was reduced by contact with a reducing stream of 100 vol % hydrogen at 300 torr for ½-hour and 450 C. (842° F.) to simulate conventional catalyst reduction. Then, the reduced catalyst was cooled to room temperature and again evacuated. The twice evacuated catalyst was then subjected to room temperature hydrogen chemisorption measurements. The results of the chemisorption measurements are shown in Table 3, and show a H/Pt ratio of 0.03.

TABLE 3

| Example | Reduction Temp., °C. | H/Pt Ratio |
|---|---|---|
| 3 | 450 | 0.03 |
| 4 | 200 | 0.34 |
| 5 | 450 | 0.03 |
| 6 | 200 | 0.40 |

EXAMPLE 4

In Example 4, the experiment was performed as described for Example 3, except the coked catalyst was oxidized to simulate the catalyst oxidation step 20, and then reduced at 200° C. (392° F.) to simulate catalyst reduction step 30. As shown in Table 3, hydrogen chemisorption measurements showed a H/Pt ratio of 0.34. Thus, the catalyst reduced at 200° C. (392° F.) shows improved hydrogen chemisorption relative to the catalyst at 450° C. (842° F.) from Example 3. This increased hydrogen chemisorption should result in higher catalyst activity.

EXAMPLE 5

Example 5 illustrates the hydrogen chemisorption of a catalyst which had been employed for dewaxing, then regenerated by oxidation to simulate the catalyst oxidation step 20, followed by a conventional reduction at 450° C. (842° F.). In this example, the test reactor of Examples 3 and 4 above, is employed to oxidize 57.8 grams of the coked catalyst of the type employed for Examples 3 and 4 above. Oxidation occurs by the following procedure to simulate the catalyst oxidation step 20. The catalyst was contacted with a 5 vol % oxygen stream for 3 hours at 460° C. (860° F.), then contacted with a 1 vol % oxygen stream for 2.3 hours at 422° C. (792° F.), then contacted with a 1.5 vol % oxygen stream for 5.4 hours at 430° C. (806° F.), and then contacted with a 2.5 vol % oxygen stream for 16.6 hours at 430° C. (806° F.). The oxygen stream represents the oxygen-containing gas stream 22. The oxygen stream 22 contains a partial pressure of 50 torr $H_2O$, and maximum molecular oxygen partial pressure of 380 torr. The oxygen stream 22 is fed to the test reactor at a constant rate of 350 actual cubic centimeters per minute, as measured at 1 atmosphere and 25° C. (77° F.). After oxidation, the catalyst was cooled to room temperature.

3 to 5 grams of the oxidized catalyst was put into a chemisorption unit, as in Examples 3 and 4 above. The unit was then evacuated to $1 \times 10^{-6}$ atmospheres at 450° C. (842° F.). Then, the evacuated catalyst was reduced by contact with a reducing stream of 100 vol % hydrogen at 300 torr for $\frac{1}{2}$-hour at 450° C. (842° F.) to simulate a conventional catalyst reduction step. Then the reduced catalyst was cooled to room temperature and again evacuated. The twice-evacuated catalyst was then subjected to room temperature chemisorption measurements. Table 3 shows the results of these hydrogen chemisorption measurements and indicates a H/Pt ratio of 0.03 for this catalyst.

EXAMPLE 6

In this example, the experiment was performed as described above in Example 5, except the catalyst was reduced at 200° C. (392° F.) to simulate the catalyst reduction step 30. As shown in Table 3, the H/Pt ratio from hydrogen chemisorption was 0.40. Thus, the catalyst reduced at 200° C. (392° F.) in this example shows better hydrogen chemisorption than the catalyst reduced at 450° C. (842° F.) in Example 5. This improved chemisorption should result in improved catalyst activity.

The recovery of catalyst activity following oxidative regeneration is an important property of a useful catalyst. The present invention describes a method of catalyst regeneration which provides better performance than conventional processes. The regeneration process may apply to any noble metal-containing zeolite catalyst. However, the present invention is preferably performed on an intermediate pore zeolite or a Zeolite Beta catalyst employed for catalystic dewaxing.

While specific embodiments of the method and apparatus aspects of the invention have been shown and described, it should be apparent that many modifications can be made thereto without departing from the spirit and scope of the invention. Accordingly, the invention is not limited to the foregoing description, but is only limited by the scope of the claims appended thereto.

We claim:

1. A process for regenerating catalyst comprising a deactivated noble metal and a zeolite wherein the catalyst has become deactivated during the dewaxing of a hydrocarbon feedstock, consisting essentially of the steps of:

oxidizing said deactivated catalyst in a gas stream comprising about 0.1 to about 10 vol. % oxygen at a temperature from about 200° C. to about 540° C. and at a feed rate of about 4.2 to about 17.0 s.c.f./hr/lb. catalyst to remove coke from said catalyst; and reducing said oxidized catalyst by contacting said oxidized catalyst with a reducing gas comprising hydrogen at a temperature from 100° to 250° C., at a hydrogen partial pressure from atmospheric to 150 atm, and a catalyst residence time from 20 minutes to 24 hours.

2. The process of claim 1, wherein said reducing step occurs at a hydrogen partial pressure from atmospheric to 30 atm.

3. The process of claim 2, wherein said reducing step occurs at a temperature from 150° to 200° C., and a catalyst residence time from 20 minutes to 10 hours.

4. The process of claim 1, wherein said noble metal is selected from the group consisting of platinum, palladium, iridium, osmium, rhodium, rhenium and ruthenium and said catalyst contains about 0.01 to about 10 wt % of said noble metal based on said zeolite.

5. The process of claim 1, wherein said noble metal is platinum and said catalyst contains about 0.1 to about 5 wt % of said platinum based on said zeolite.

6. The process of claim 5, wherein said catalyst contains about 0.1 to about 1.2 wt % of said platinum based on said zeolite.

7. The process of claim 4, wherein said zeolite has the structure of a member of the group consisting of ZSM-5, ZSM-5/ZSM-11 intermediates, ZSM-11, ZSM-12, ZSM-22, ZSM-23, ZSM-35, ZSM-38 and ZSM-48.

8. The process of claim 4, wherein said zeolite has the structure of a member of the group consisting of Zeolite Y, ZSM-3, ZSM-4, ZSM-18 and ZSM-20.

9. The process of claim 4, wherein said zeolite has the structure of Zeolite Beta.

10. The process of claim 9, wherein said reducing gas comprises at least 50 vol % hydrogen.

11. A process for regenerating deactivated catalyst comprising a zeolite having the structure of Zeolite Beta and about 0.1 to about 1.2 wt % platinum metal based on said zeolite, wherein said catalyst has been deactivated during the dewaxing of a hydrocarbon feedstock, consisting essentially of the steps of:

oxidizing said deactivated catalyst in a gas stream comprising about 0.1 to about 10 vol. % oxygen at a temperature from about 200° C. to about 540° C. and at a feed rate of about 4.2 to about 17.0 s.c.f./m/lb. catalyst to remove coke from said catalyst; and reducing said oxidized catalyst by contacting said catalyst with a reducing gas comprising 50 vol. % hydrogen at a temperature from 150° to 200° C., a hydrogen partial pressure from atmospheric to 30 atm, and a catalyst residence time of 20 minutes to 10 hours.

* * * * *